United States Patent
Budhraja et al.

(10) Patent No.: US 12,067,042 B2
(45) Date of Patent: Aug. 20, 2024

(54) SYSTEM AND METHOD OF ENABLING AND MANAGING PROACTIVE COLLABORATION

(71) Applicant: HEXAGON TECHNOLOGY CENTER GMBH, Heerbrugg (CH)

(72) Inventors: Akshit Budhraja, Heerbrugg (CH); Tobias Bösch Borgards, Teufen (CH); Bernd Reimann, Heerbrugg (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 84 days.

(21) Appl. No.: 17/715,895

(22) Filed: Apr. 7, 2022

(65) Prior Publication Data

US 2023/0325427 A1 Oct. 12, 2023

(51) Int. Cl.
*G06F 16/35* (2019.01)
*G06N 20/00* (2019.01)
*H04L 51/21* (2022.01)

(52) U.S. Cl.
CPC ........... *G06F 16/353* (2019.01); *G06N 20/00* (2019.01); *H04L 51/21* (2022.05)

(58) Field of Classification Search
CPC ........ G06F 16/353; G06N 20/00; H04L 51/21
USPC ....................................................... 707/739
See application file for complete search history.

(56) References Cited

U.S. PATENT DOCUMENTS 10,021,185 B1 * 7/2018 Kleinschnitz, Jr. ... G06F 9/5011
10,565,372 B1 * 2/2020 Stickle .................... G06F 21/55
10,705,796 B1 * 7/2020 Doyle .................... G06F 16/282
11,238,410 B1 * 2/2022 Wright .................... G06N 20/00
(Continued)

FOREIGN PATENT DOCUMENTS

CN        111400595 A  *  7/2020  .......... G06F 11/3438
EP         3187951 A1  *  7/2017  .......... G05B 23/0267
(Continued)

OTHER PUBLICATIONS

Chanda et al., "A Parallel Processing Technique for Extracting and Storing User Specified Data", the 8th International Conference on Future Internet of Things and Cloud (FiCloud), 2021, pp. 241-249. (Year: 2021).*

(Continued)

*Primary Examiner* — Phuong Thao Cao

(74) *Attorney, Agent, or Firm* — Maschoff Brennan

(57) ABSTRACT

A collaboration management system, comprising a database having stored operator information about the participating operators, the operator information of each operator comprising at least one operator class assigned to the respective operator; a data receiver configured to receive a data stream comprising a plurality of electronic messages from a plurality of communicating agents, each electronic message comprising at least one piece of information; a message parser operatively coupled with the data receiver, the message parser configured to parse the received electronic messages to extract pieces of information of the parsed electronic messages and to classify the electronic messages according to one or more ontologies from a set of predefined ontologies; a recommendation engine operatively coupled with the message parser and the database; and a data distributor operatively coupled with the recommendation engine.

20 Claims, 10 Drawing Sheets

(56) References Cited

U.S. PATENT DOCUMENTS

| | | | |
|---|---|---|---|
| 11,461,067 B2* | 10/2022 | Nagar | H04L 67/131 |
| 11,798,675 B2* | 10/2023 | Larkin | G16H 10/60 |
| 2012/0259852 A1* | 10/2012 | Aasen | G06F 16/24578 |
| | | | 707/E17.014 |
| 2012/0259926 A1* | 10/2012 | Lockhart | H04L 51/10 |
| | | | 709/206 |
| 2013/0226559 A1* | 8/2013 | Lim | G06F 16/9535 |
| | | | 704/9 |
| 2014/0280166 A1* | 9/2014 | Bryars | G06F 16/245 |
| | | | 707/738 |
| 2018/0129971 A1* | 5/2018 | Vlassis | G06N 20/00 |
| 2018/0182015 A1* | 6/2018 | Su | G06N 20/10 |
| 2019/0095495 A1* | 3/2019 | Venkata Naga Ravi | |
| | | | G06F 16/24568 |
| 2019/0342415 A1* | 11/2019 | Lu | H04L 67/535 |
| 2020/0073932 A1* | 3/2020 | Jia | G06F 16/9024 |
| 2020/0272914 A1* | 8/2020 | Jeyakumar | G06Q 30/02 |
| 2021/0004391 A1* | 1/2021 | Ferreira, Jr. | G06F 16/285 |
| 2021/0056425 A1* | 2/2021 | Jeong | G06F 18/217 |
| 2021/0125098 A1* | 4/2021 | Peran | G06N 20/20 |
| 2021/0174423 A1* | 6/2021 | Mullins | G06Q 30/0641 |
| 2021/0209109 A1* | 7/2021 | Zhang | G06F 40/284 |
| 2021/0241299 A1* | 8/2021 | Ramini | G06N 5/025 |
| 2022/0122731 A1* | 4/2022 | Chen | G06F 16/24578 |
| 2022/0236843 A1* | 7/2022 | Wilde | G06F 3/0481 |
| 2022/0237374 A1* | 7/2022 | Wilde | G06F 3/04842 |
| 2022/0245557 A1* | 8/2022 | Minter | G06N 20/00 |
| 2022/0246286 A1* | 8/2022 | Eddy | G16H 40/20 |
| 2023/0098882 A1* | 3/2023 | Sinn | G06F 16/9535 |
| | | | 707/732 |
| 2023/0138836 A1* | 5/2023 | Sharma | G06Q 10/103 |
| | | | 705/301 |
| 2023/0141398 A1* | 5/2023 | Bahdanau | G06F 40/30 |
| | | | 704/9 |
| 2023/0169527 A1* | 6/2023 | Morningstar | G06N 5/022 |
| | | | 705/7.32 |
| 2023/0267922 A1* | 8/2023 | Siohan | H04L 12/1831 |
| | | | 704/205 |

FOREIGN PATENT DOCUMENTS

| | | | | |
|---|---|---|---|---|
| FI | 118751 B | * | 2/2008 | |
| GB | 2546797 A | * | 8/2017 | G06F 16/31 |
| JP | 2004030649 A | * | 1/2004 | G06Q 30/02 |
| WO | WO-2021032620 A1 | * | 2/2021 | G06F 16/54 |

OTHER PUBLICATIONS

Luo et al., "Design and Research of Intelligent Message Platform System in Hospital", the 2020 IEEE International Conference on E-Health Networking, Application & Services (HEALTHCOM), 2020, 5 pages. (Year: 2020).*

* cited by examiner

| Pre-defined ontology | Automated tagging of incoming text streams |
|---|---|
|  | .@NYGovCuomo orders closing of NYC bridges. Only Staten Island bridges unaffected at this time. Bridges must close by 7pm. #Sandy #NYC  |
|  Information Source | RT @NBCNewsPictures: Photos of the unbelievable scenes left in #Hurricane #Sandy's wake  |
|  | rt @911buff: public help needed: 2 boys 2 & 4 missing nearly 24 hours after they got separated from their mom when car submerged in si. #sandy #911buf  |
| 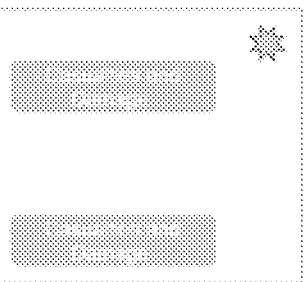 | RT @TIME: NYC building had numerous construction complaints before crane collapse http://t.co/7EDmKOp3 #Sandy  |
| | At least 39 dead millions without power in Sandy's aftermath. http://t.co/Wdvz8KK8  |
|  Donations/Support | 400 Volunteers are needed for areas that #Sandy destroyed.  |
|  Donations/Support | I want to volunteer to help the hurricane Sandy victims. If anyone knows how I can get involved please let me know!  |

Fig. 4

Step 1: Unsupervised similarity scoring

Feature Design:

1. Underlying intent
2. Extracted named entities
3. Semantic representation
4. Part-of-speech tags
5. Geographical location
6. Time scale

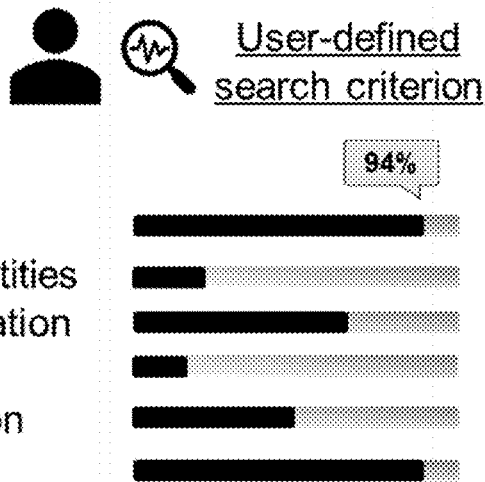

User-defined search criterion

94%

Step 2: Review recommendations

User feedback

👍 Provided recommendation was useful

👎 Provided recommendation was not relevant

Step 3: Supervised similarity scoring

Raw input data

Training AI Models

User feedback

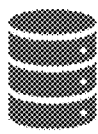

Fig. 6a

SYSTEM AND METHOD OF ENABLING AND MANAGING PROACTIVE COLLABORATION

FIELD OF THE INVENTION

The invention generally relates to enabling and managing collaboration between a plurality of operators. The operators may belong to the same organization or to different organizations and share a common interest. For instance, in some embodiments, these operators or organizations provide a variety of public services in a "Smart City" environment. In some embodiments, managing the collaboration involves using artificial intelligence to selectively provide extracts from messages published by one operator to other operators.

BACKGROUND OF THE INVENTION

In passive and reactive approaches to collaboration, messages are shared ad hoc between different communicating organizations—either directly or via social media platforms. Such an approach often turns out to be inefficient, inconsistent and prone to errors. For instance, so-called "silos" may obstruct collaboration between the different operators or organizations. "Siloed" behavior may result from teams working in closed environments with no encouragement to share information with other teams or organizations. Also information overflow may become a problem, when operators are overwhelmed by a multitude of feeds from communicating organizations and social media and a high volume of the feeds. It would thus be desirable to automatically extract and indicate information that is relevant for the operator or to indicate suitable collaboration partners in other organizations to achieve a certain goal.

It is an object to provide an improved system and an improved method for managing collaboration between a plurality of participating operators.

SUMMARY

A first aspect pertains to a collaboration management system for managing collaboration between a plurality of participating operators. According to some embodiments, the system comprises

- a database having stored operator information about the participating operators, the operator information of each operator comprising at least one operator class assigned to the respective operator;
- a data receiver configured to receive a data stream comprising a plurality of electronic messages from a plurality of communicating agents, each electronic message comprising at least one piece of information;
- a message parser operatively coupled with the data receiver, the message parser configured to parse the received electronic messages to extract pieces of information of the parsed electronic messages and to classify the electronic messages according to one or more ontologies from a set of pre-defined ontologies;
- a recommendation engine operatively coupled with the message parser and the database, the recommendation engine configured to decide for each extracted piece of information whether it is considered class-relevant information for one or more of the operator classes; and
- a data distributor operatively coupled with the recommendation engine, the data distributor configured to provide, based on the assigned one or more operator classes, to each operator of at least a subset of the plurality of participating operators one or more pieces of information that are considered class-relevant information for the respective operator.

According to some embodiments, the data distributor is configured to provide the pieces of information via a remote data network.

According to some embodiments, the pieces of information comprise at least one of keywords and named entities.

According to some embodiments, at least a subset of the electronic messages comprises at least one information in the form of textual information, image information, and/or spoken information.

According to some embodiments, at least a subset of the electronic messages are messages that are published on one or more social-media platforms.

According to some embodiments, at least a subset of the communicating agents are participating operators. According to some embodiments, at least a subset of the communicating agents are public organizations, wherein at least a subset of the participating operators are associated with one of the public organizations.

According to some embodiments, an electronic device is assigned to each participating operator, and the data distributor is configured to provide the pieces of information to the electronic devices. The recommendation engine may be operatively coupled with the electronic devices and configured

- to monitor the electronic devices to detect a behavior of the operators, to determine, based on the detected behavior, an appropriate operator class for the operator, and to dynamically assign the determined appropriate operator class as the operator class in the database; and/or
- to receive user inputs from the electronic devices, the user inputs comprising a selection from the operator of an operator class, and to assign the selected operator class in the database.

According to some embodiments, at least a subset of the electronic messages is sent from a mobile communication device together with geolocation information, and the message parser is configured to link the geolocation information with the extracted pieces of information.

According to some embodiments, the message parser is configured to parse the received electronic messages to create a plurality of feature snippets based on the extracted pieces of information. The message parser may be configured to create at least a subset of the plurality of feature snippets based on at least two parsed electronic messages.

According to some embodiments, for deciding whether an extracted piece of information is considered class-relevant information the recommendation engine is configured to use either a rule-based approach, a machine-learning algorithm, a hybrid approach that includes the rule-based approach and a machine-learning algorithm, or a combination thereof.

According to some embodiments, the recommendation engine is an unsupervised recommendation engine configured to use pre-trained models for deciding for each extracted piece of information whether it is class-relevant information. The recommendation engine may be configured

- to receive user feedback from the operators, the user feedback comprising information on whether a piece of information provided to the operator is considered relevant by the operator, and
- to train the machine-learning algorithm based on the user feedback.

According to some embodiments, an electronic device is assigned to each participating operator, the data distributor is configured to provide the pieces of information to the electronic devices, and the recommendation engine is operatively coupled with the electronic devices and configured to monitor the electronic devices to detect a behavior of the operators, and to train the machine-learning algorithm based on the detected behavior. The detected behavior may comprise information on whether a piece of information provided to the operator is considered relevant by the operator. Also, the recommendation engine may be configured to perform clickstream analysis for detecting the behavior of the operators.

According to some embodiments, the system further comprises a classification module operatively coupled with the message parser, wherein the classification module is configured to identify an information class of an extracted piece of information using trained artificial-intelligence agents (AI agents). The information class may be part of a classification scheme given by a pre-defined ontology or may comprise an intent or incident type. The AI agents may be trained using a re-trainable natural language processing (NLP) classifier based on a language model. The language model may be a Bidirectional Encoder Representations from Transformers (BERT) language model.

According to some embodiments, the recommendation engine is configured to derive a decision threshold as a basis for deciding whether or not an extracted piece of information is considered class-relevant information. The recommendation engine may be configured to derive the decision threshold using a pre-trained BERT language model, a logit function, a Softmax function and one or more datasets used for training the pre-trained model.

A second aspect pertains to a method for managing collaboration between a plurality of participating operators. Optionally, the method may be performed by a system according to the first aspect of the invention. According to some embodiments, the method comprises:

receiving a data stream comprising a plurality of electronic messages from the plurality of communicating agents, each electronic message comprising at least one piece of information;

using a message parser to parse the received electronic messages and to extract pieces of information;

classifying the electronic messages according to one or more ontologies from a set of pre-defined ontologies;

accessing a database to retrieve information about the participating operators, the information of each operator comprising at least one operator class assigned to the respective operator;

deciding for each extracted piece of information and for one or more of the operator classes, whether the extracted piece of information is considered class-relevant information for the operator class; and providing to each operator of at least a subset of the plurality of participating operators, based at least on the one or more operator classes assigned to the respective operator, pieces of information that are considered class-relevant information for the respective operator.

A second aspect pertains to a computer program product including a non-transitory computer-readable medium having computer code thereon for managing collaboration between a plurality of participating operators. particularly, the computer program product may run on a system according to the first aspect to perform a method according to the second aspect. According to some embodiments, the computer code comprises:

program code for receiving a data stream comprising a plurality of electronic messages from a plurality of communicating agents, each electronic message comprising at least one piece of information;

program code for parsing, by a message parser, the received electronic messages and to extract pieces of information;

program code for classifying the electronic messages according to one or more ontologies from a set of pre-defined ontologies;

program code for accessing a database to retrieve information about the participating operators, the information of each operator comprising at least one operator class assigned to the respective operator;

program code for deciding for each extracted piece of information and for one or more of the operator classes, whether the extracted piece of information is considered class-relevant information for the operator class; and program code for providing to each operator of at least a subset of the plurality of participating operators, based at least on the one or more operator classes assigned to the respective operator, pieces of information that are considered class-relevant information for the respective operator.

BRIEF DESCRIPTION OF THE DRAWINGS

The invention in the following will be described in detail by referring to exemplary embodiments that are accompanied by figures, in which:

FIG. 4 illustrates the step of intent classification;

FIGS. 6a-c illustrate the step of deciding which information is relevant for which operator;

DETAILED DESCRIPTION

Figure 1:
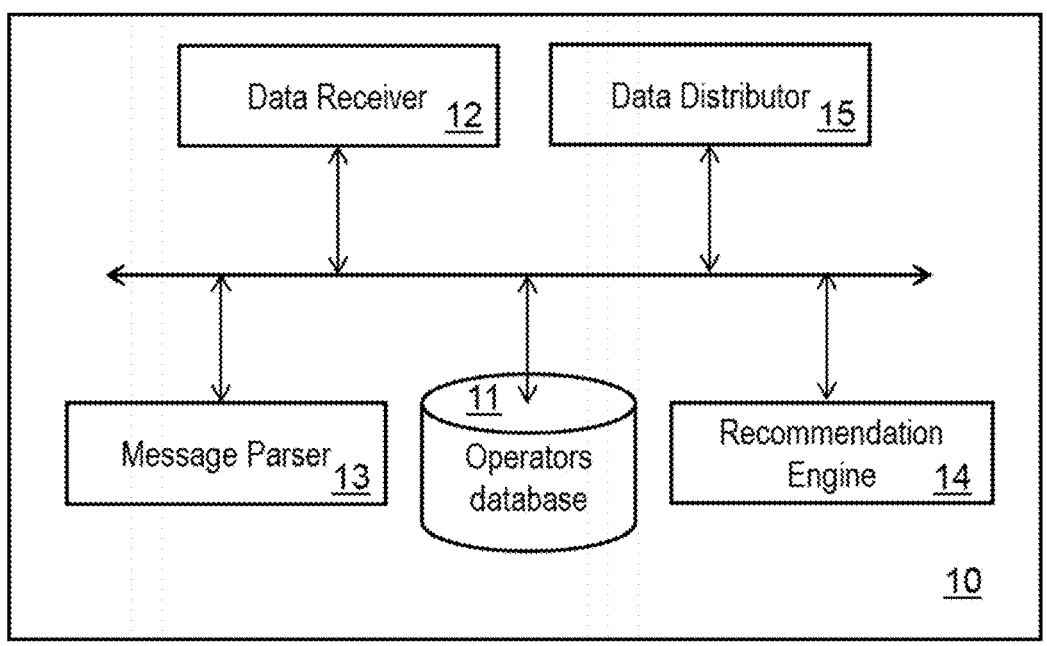
FIG. 1 shows a collaboration management system for managing collaboration between participating operators.

FIG. 1 shows a collaboration management system 10 for managing collaboration between a plurality of participating operators. The system 10 comprises an operator database 11 having stored information about the participating operators, the information of each operator comprising at least one operator class assigned to the respective operator.

The system 10 also comprises a data receiver 12 that is configured to receive a data stream comprising a plurality of electronic messages from communicating organizations, each electronic message comprising at least one textual information. The communicating organizations may include the plurality of operators as well as operators relaying messages through commercial data feed providers or social media.

The system 10 also comprises a message parser 13 operatively coupled with the data receiver 12. The message parser 13 is configured to parse the received electronic messages to extract information of the parsed electronic messages and to classify the electronic messages according to one or more ontologies from a set of pre-defined ontologies.

The system 10 also comprises a recommendation engine 14 operatively coupled with the message parser 13 and the database 11. The recommendation engine 14 is configured to decide for each extracted information whether it is considered class-relevant information for one or more of the operator classes.

At least a subset of the received electronic messages comprises information in the form of a text, and the message parser 13 is configured to extract textual information from the text. Optionally, one or more electronic messages include information provided by audio including speech and/or by images or video, and the message parser 13 is configured to extract spoken information from the audio, e.g. by means of speech-to-text, or from the imaged information from the images or video, e.g. by image summarization.

The system 10 also comprises a data distributor 15 operatively coupled with the recommendation engine 14. The data distributor 15 is configured to provide, based on the assigned one or more operator classes, to each operator of at least a subset of the plurality of participating operators textual information that is considered class-relevant information for the respective operator.

Figure 2:
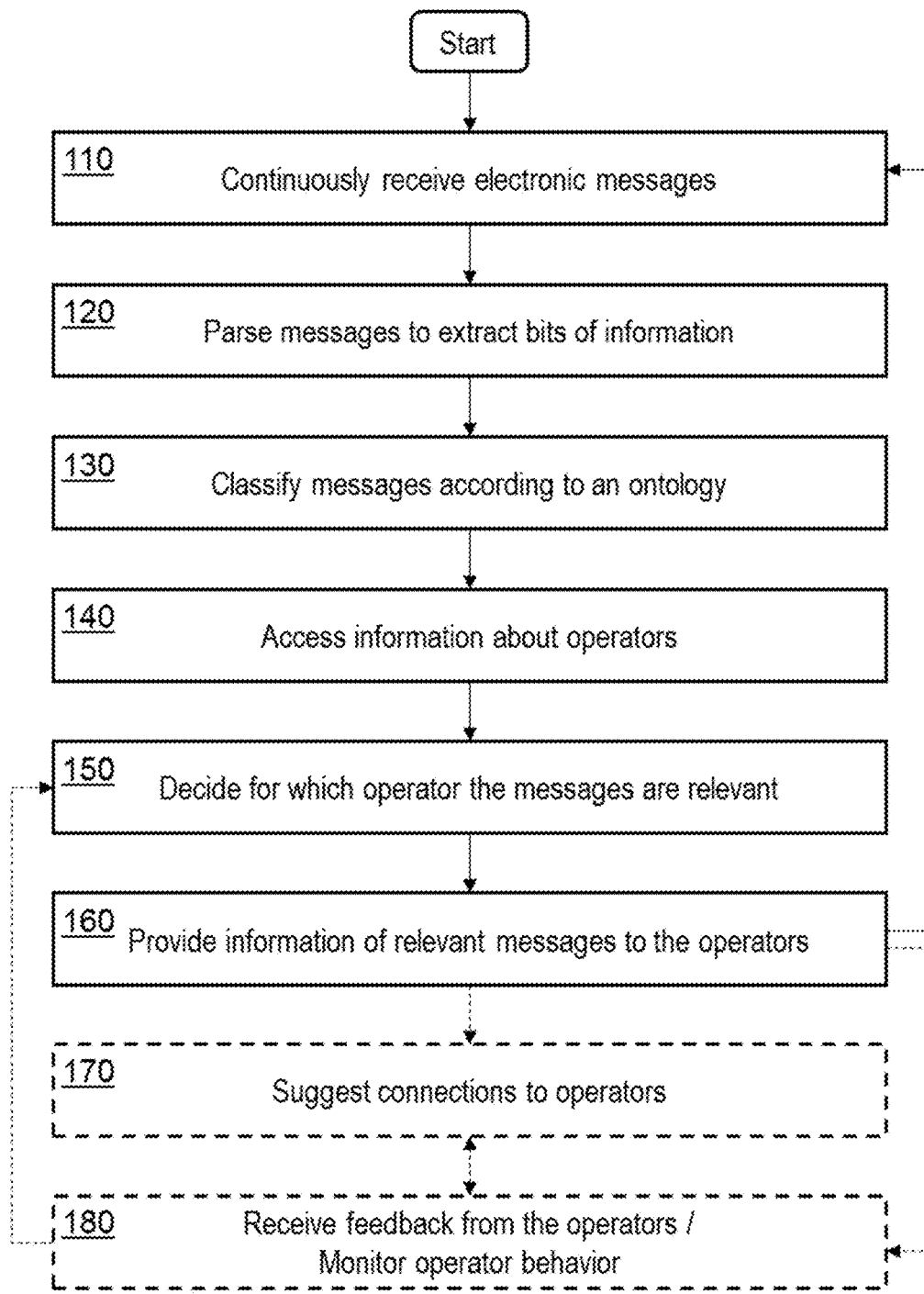
FIG. 2 shows steps of a method for managing collaboration between participating operators.

FIG. 2 shows a flow chart illustrating an exemplary embodiment of a computer-implemented method for managing collaboration between a plurality of participating operators. For instance, the method can be performed using the system of FIG. 1.

After starting the method, a data stream is continuously received 110, the data stream comprising a plurality of electronic messages from a plurality of communicating agents. For instance, some of these agents may be public organizations. Also, some or all of the participating operators may be communicating agents and/or associated with one of the public organizations. At least a subset of the electronic messages may be coming from social-media platforms. Each electronic message comprises at least one piece of information. The electronic messages may comprise text messages, and the at least one piece of information is provided in the form of textual information. Alternatively or additionally, some electronic messages may comprise the information in the form of images or audio messages, in particular speech, where the information content is then converted into textual features.

Next, a message parser is used to parse 120 the received electronic messages and to extract key bits of information from each message based on this parsing. For instance, these key bits may comprise keywords or named entities. Based on the extracted information, the electronic messages are classified 130 according to a pre-defined ontology, or more precisely according to one or more ontologies from a set of pre-defined ontologies.

Information about the participating operators that is stored in a database (operator database 11) is accessed 140, the stored information of each operator comprising at least one operator class assigned to the respective operator.

In some embodiments, the operator class of an operator might change. For instance, the operator may configure the class himself depending on a present case or assignment. Alternatively, an appropriate class may be detected automatically and dynamically based on the operator's behavior, for instance by analyzing the operator's clickstream. In general, clickstream analysis is the tracking and analysis of visits to websites and comprises collecting, analyzing and reporting aggregate data about which pages a person opens and in what order. For detecting an appropriate operator class, clickstream analysis may comprise collecting, analyzing and reporting aggregate data about what presented information an operator is interested in, e.g. in which order the operator clicks on said information.

An algorithm then decides 150 for each message and for one or more of the operator classes, based at least on the extracted textual information or the classification, whether a message should be considered class-relevant information for the operator class, i.e. whether it is relevant enough to be presented to the operators of that operator class. For instance, this decision may be based on
 a) pre-defined operator rules, such as a match against a geo-temporal signature of the extracted message;
 b) machine learning and a pre-trained artificial intelligence; or
 c) a hybrid approach of (a) and (b).

Figure 5:
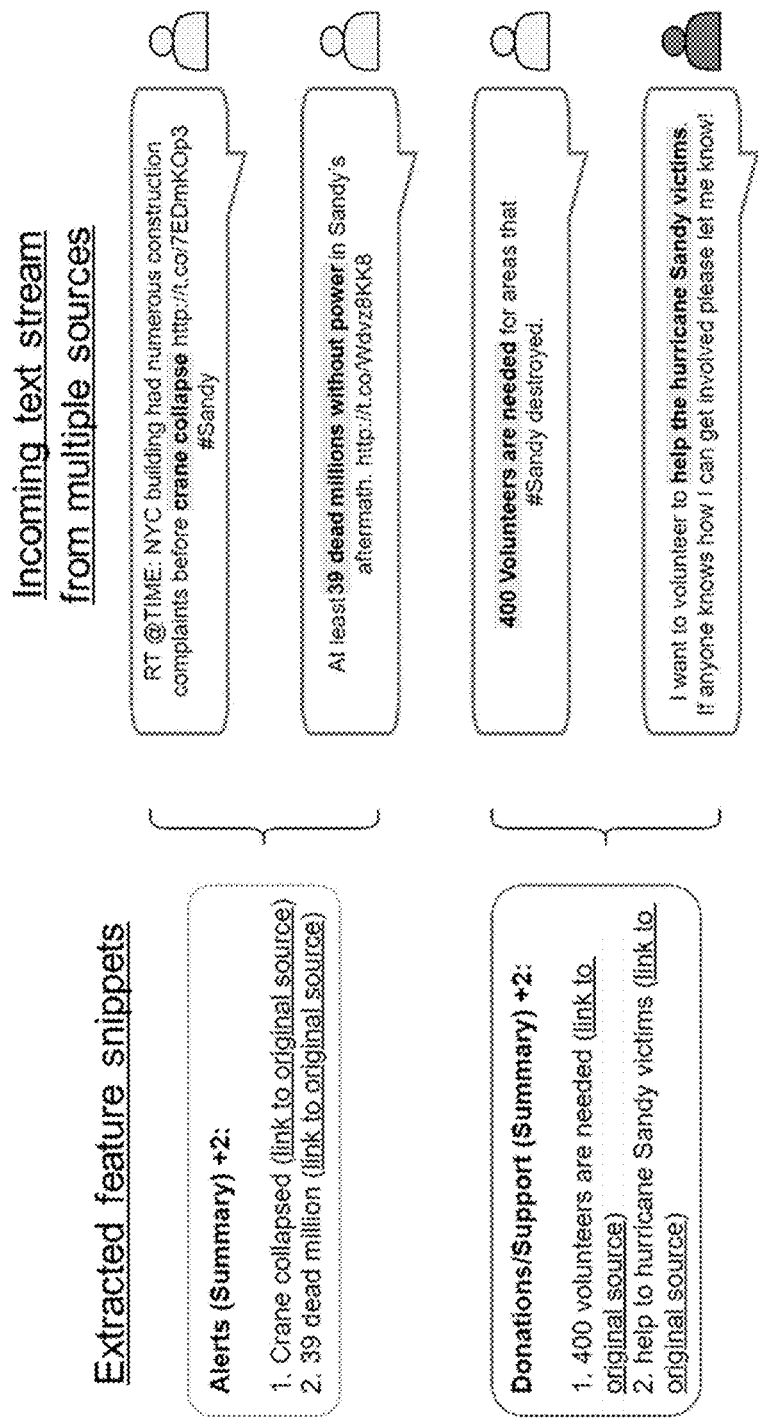
FIG. 5 illustrates the step of creating feature snippets.

In the case of the decision being based on machine learning and a pre-trained artificial intelligence, the underlying intent of the extracted message may be identified using state-of-the-art natural language processing models such as decision trees, support vector machines (SVMs), neural networks or transformers (e.g. as illustrated in FIG. 4). It may be used in conjunction with extracted entities from the message such as "name of the person" (e.g. as illustrated in FIG. 5) to infer relevance of a given message for an operator class.

In the case of a hybrid approach, information from both artificial intelligence-based models and rule-based models are combined together, and relevance of a given message for an operator class is identified by a unified search criterion (e.g. as illustrated in FIG. 6).

Next, the relevant messages—or the extracted textual information—are then provided 160 to the operators. For instance, to at least a subset of the plurality of participating operators textual information that is considered class-relevant information for the respective operator may be provided 160, based at least on the one or more operator classes assigned to the respective operator and on the decision 150 whether the message comprises class-relevant information. The method continues from the top by continuously receiving 110 further electronic messages.

Optionally, the operators may also be provided with a suggestion 170 to connect with certain other participating operators or organizations. This suggestion fosters collaborations and can be based on their similar interests that can be inferred from their past behaviour, e.g. by using clickstream data or feedback on provided recommendations (see step 180 below).

Further, optionally, feedback may be received 180 from the operators, whether or not the provided information or suggestion was also considered relevant or useful by the respective operator. This feedback may be provided actively by the operators after receiving an information, e.g. by selecting one of the provided options "was relevant/useful" and "was not relevant/useful". Alternatively or additionally, the operator's behaviour regarding the information may be monitored as a passive feedback, e.g. whether the information is read or discarded. This feedback may then be used in the step of deciding 150 for further messages whether they are relevant or not for a certain operator class. In particular, the feedback may be used to further train the artificial intelligence involved in the decision making. Clickstream analysis may be used to indirectly capture user feedback.

Figure 3:
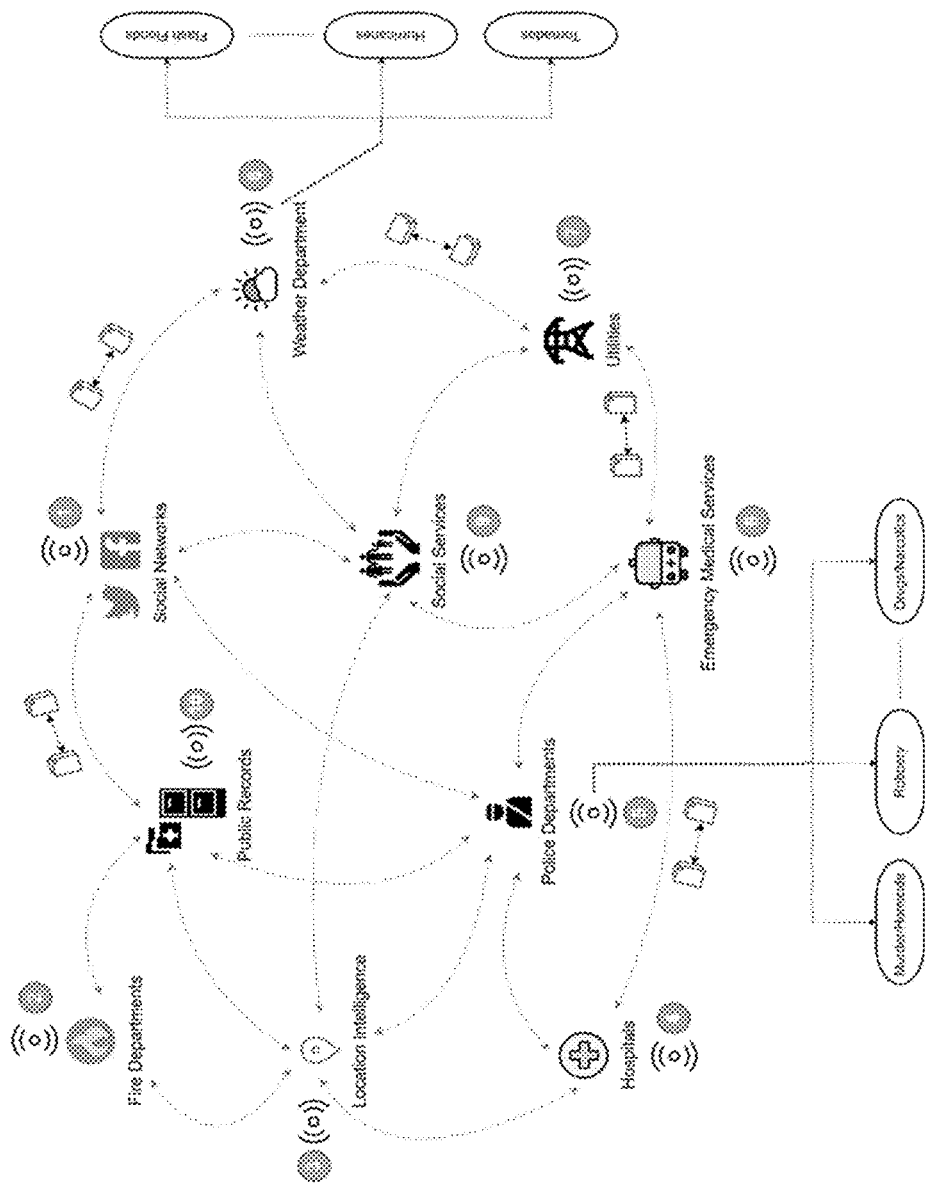
FIG. 3 shows a social graph illustrating a proactive approach to collaboration.

FIG. 3 shows a social graph illustrating a proactive approach to collaboration according to embodiments of the present invention. The social graph is a model or representation of a social network involving a number of participating organizations, i.e. a graph that represents social relations between these organizations.

In the illustrated proactive approach, collaborations between different organizations are enabled using the social graphs and data linking. Data linking comprises generating linked data, i.e. structured data which is interlinked with other data so it becomes more useful through semantic queries. Interactions and data are used to mine and re-surface effective collaborations and to connect people that share similar interests across and within organizations.

Each communicating organization can be regarded as a communication node of a social graph. In the shown example, the communicating organizations comprise public organizations such as fire departments, hospitals, police departments, emergency medical services, utilities, social services and weather departments.

The communication also relies on social networks, public records and location intelligence as further communication nodes.

For instance, as illustrated here, communications from police departments may include text streams related to crimes, and communications from weather departments may include text streams related to hazardous weather or similar natural disasters.

According to the proactive approach illustrated here, at each communication node, a collaboration management system listens to the respective data streams (indicated by circles labelled 1 to 10), organizes and catalogues information and extracts meta data from the data streams. Related data streams across different organizations may be discovered, and the relations may be used as a proxy for overlap and for potential collaborations.

FIG. 4 illustrates the step of intent classification as a part of a method for managing collaboration between a plurality of participating operators. In the right column, incoming text streams from multiple sources are shown that are automatically tagged. In the shown example, all texts are related to a hurricane called "Sandy".

In the left column pre-defined ontologies are shown, that are assigned to the adjacent text streams of the right column. Free-form textual feeds from multiple sources are mapped according to the pre-defined ontologies. This may include visual screening of the textual feeds to enable intent-specific workflows. In the shown example, the assigned ontologies comprise the following intents: "Caution or Advice", "Information Source", "People: Missing/Found", "Casualties and Damage", and "Donations/Support". A notification is raised wherever a pre-defined intent is detected, in the shown example the intent "Casualties and Damage".

It is possible to flexibly create hierarchical ontologies, e.g. by further breaking down the intent "Casualties and Damage" into the subclasses "Casualties and Damage/Infrastructure" and "Casualties and Damage/Injured or Dead".

FIG. 5 illustrates the step of creating feature snippets as a part of a method for managing collaboration between a plurality of participating operators. In the right column, four incoming text streams of the text streams of FIG. 4 are shown. Class-relevant information is extracted from the free-form textual feeds to create feature snippets. A condensed summary of the events is created to enhance search results based on keywords and to enable intent-specific workflows.

Named entities are extracted from a given textual information. Which entities are extracted from the free-form textual feeds may depend on the assigned ontology. For instance, if the intent is "Casualties and Damage", "place" and "date" entities may always be included to the extracted feature snippet.

Figure 6B:
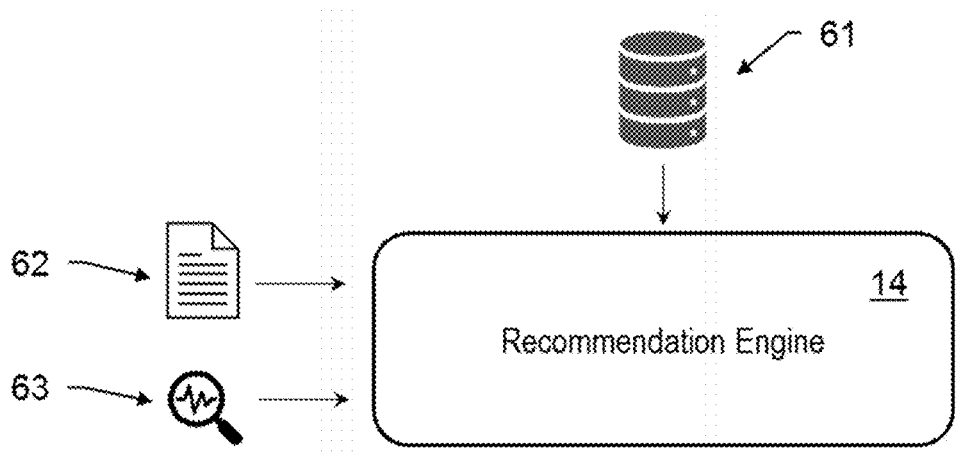
Figure 6C:
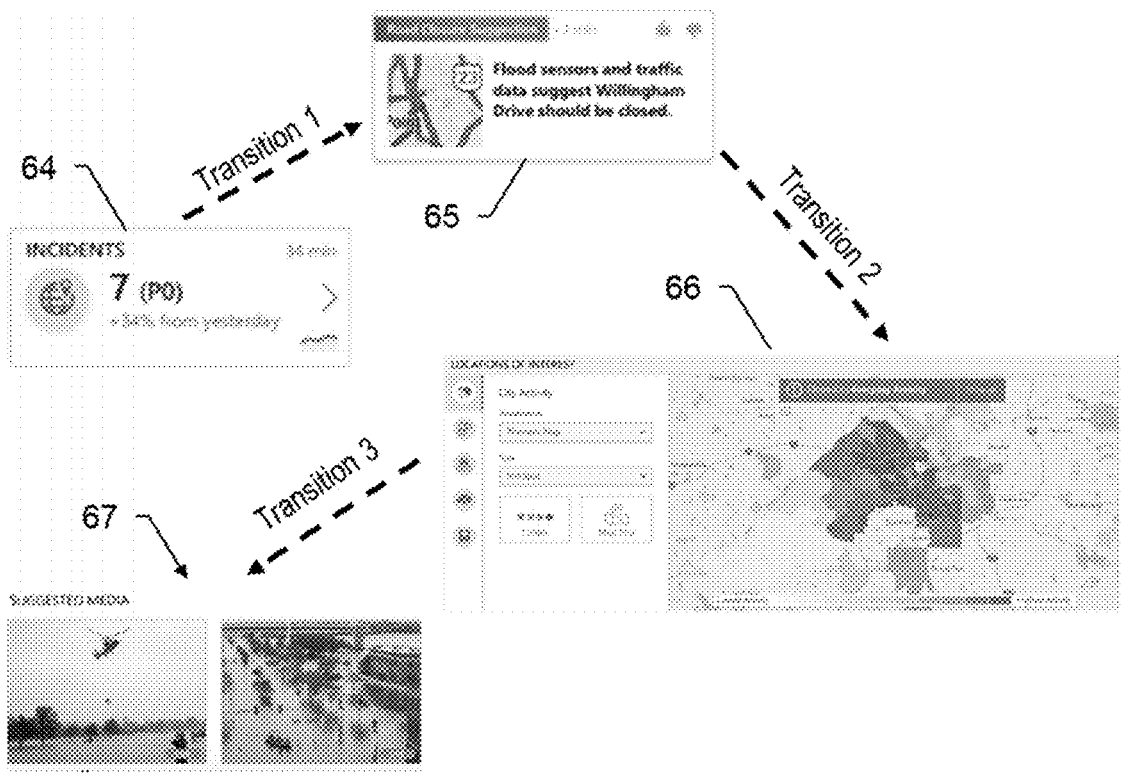

FIGS. 6a-c illustrate an exemplary approach for deciding which information might be relevant for which operator, i.e. to whom the snippets will be provided.

Referring to FIG. 6a, a human-in-loop recommendation engine is used to discover similar events across multiple data sources. Similar events are mapped together so that a search criterion can be customized to include spatiotemporal features, alongside raw-content information. The pre-trained models can be used to enable an unsupervised recommendation engine. User feedback can be included to facilitate transition to a supervised approach ("transfer learning").

The decision-making may include similarity scoring to create a function that takes a pair of messages and produces a numerical score ("similarity score") quantifying their relatedness. For such a pair of messages this score is high when the content of the pair covers the same topic. Techniques for improving the quality of similarity scores include density adjustment, vector embedding, and co-occurrence and contingency tables.

The shown example comprises three steps: Step 1 comprises unsupervised similarity scoring. A user-defined, customized search criterion is used to determine similarities in a number of feature designs of a pair of messages. In the shown example, six feature designs are used, wherein four are raw-content-related, including underlying intent, extracted named entities, semantic representation and part-of-speech (POS) tags, and two are space- or time-related (geographical location and time scale). Each of these feature designs has a different contribution in generating final recommendations as indicated by the black bars. The operator may use these bars to adjust the specifics of the matching process. In the shown example, the underlying intent e.g. has a contribution of 94%.

Step 2 comprises review recommendations based on user feedback. The user to whom a message has been provided may choose to provide feedback on whether the provided, i.e. recommended, message was useful or irrelevant. Step 3 comprises supervised similarity scoring, in which the AI models that are used for decision making are trained based on the raw input data and on the user feedback.

FIG. 6b illustrates the use of a search corpus 61 for recommending by the recommendation engine 14 similar content or proactively discover meaningful collaboration partners. The search corpus may include all previous messages, interactions and collaborations that are stored in a database. Together with input description 62 and a user-defined search criterion 63, the search corpus 61 is provided to the recommendation engine 14 to allow similarity scoring.

FIG. 6c shows an example of a clickstream of an operator. User interaction of the operators may be captured for performing interest analysis from clickstream. Advantageously, this allows improved real-time access to relevant information streams. Clickstream data is analysed to understand user preferences. The clickstream data may be complemented with pre-trained contextual models to understand the underlying dependencies and correlations. In the shown example, the clickstream analysis shows that the operator at first clicked on application 64, showing the current number of high priority incidents (P0). The operator then transitioned to application 65, showing a road closure suggestion, and to application 66, showing a thematic map. Based on this captured user interaction, including both the watched applications and the transitions between them, further information may be suggested to the operator. In the shown example, the information is provided in the form of suggested media 67 that is related to the applications 64, 65, 66 previously clicked by the operator. The clickstream analysis also allows determining whether the operator is interested in viewing the suggested media 67 to enhance suggestions in the future.

Figure 7:
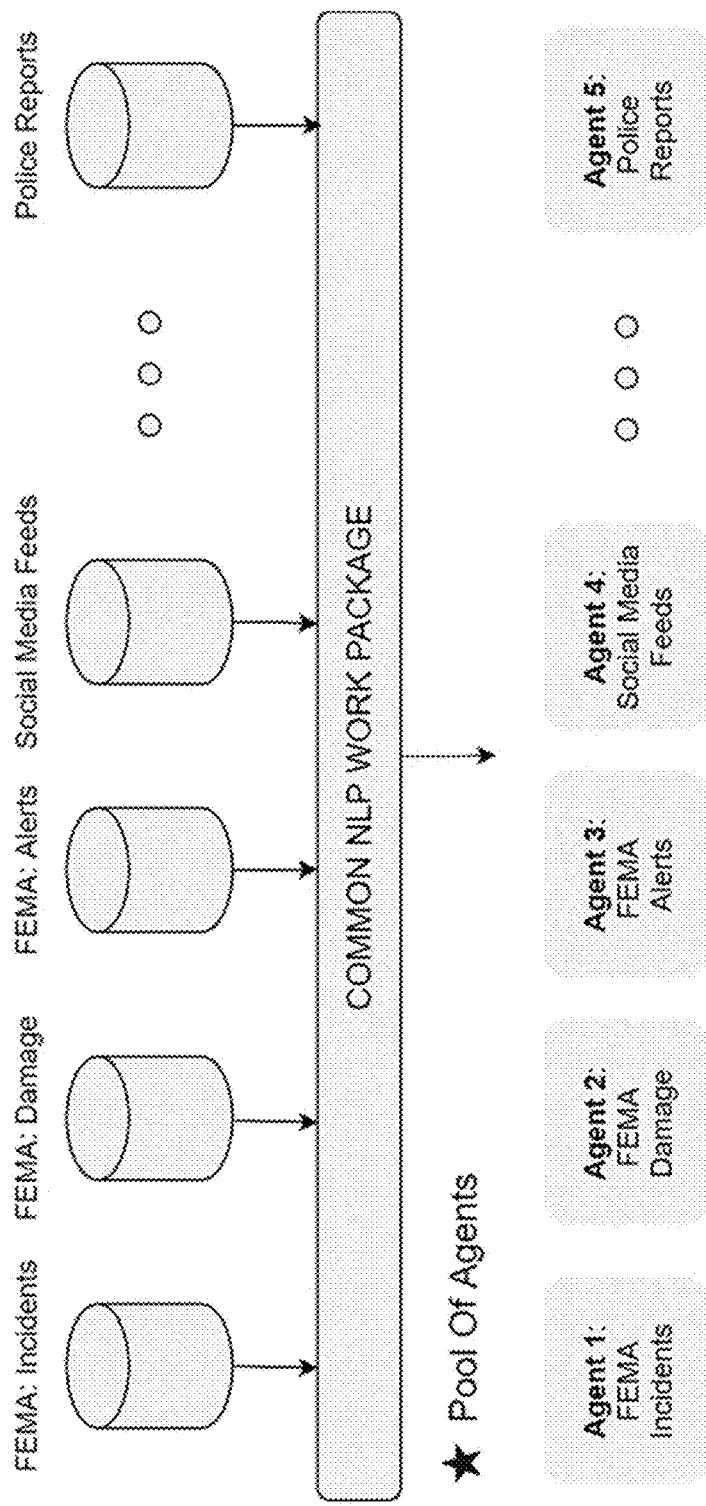
FIG. 7 shows a training module for AI agents.

FIG. 7 shows a training module that can be used to train specific agents on any classification dataset with similar wording and statistics, e.g. intent and incident type identification. A pool of domain-specific AI agents, based e.g. on natural language processing (NLP), can be used to allow creating re-trainable classifiers for intent classification.

The pool of domain-specific AI agents may comprise one or more agents at each organization, e.g., using the example of FIG. 3, a fire departments agent at the fire departments, a hospitals agent at the hospitals, a weather departments agent at the weather departments, a public records agent at the public records etc. These agents are usually trained on domain-specific datasets and used to implement the below mentioned use cases.

In another embodiment the agents are trained on publicly available datasets that closely match the distribution of a domain-specific dataset, which might not be available. Several agents trained on publicly available data for a given domain are used together instead of an agent trained on a domain-specific dataset. A configured out-of-class threshold for each such agent ensures said agents trained on publicly available data are used in below use cases only, when the messages to be processed fall into their domain.

Applications thereof may include:
organizing data streams for each organization, e.g. to categorize if a given police department report concerns the "homicide" division or the "robbery" division;
proactive recommendations on possible collaborations across organizations using the pool of agents, e.g. if the AI agent detected "accident" and "power-line breakdown" from a report, trigger a collaboration channel between police department and utilities department;
highlighting important bits of information from the raw data streams for faster visual screening by operators;
notifications for the operators regarding related content that might assist them with an ongoing investigation; and
using operator interactions (e.g. clickstream data and ratings) as a proxy for human-in-loop feedback to update the social graph and data links.

The shown module comprises a common natural language processing (NLP) work package which is trained with messages from all available public and domain-specific datasets to produce trained agents for these datasets. Furthermore, all public datasets may be used to calculate and configure activity thresholds to partition agents into non-overlapping domains. In the shown example, the available public datasets comprise incidents, damage and alerts reports from a public emergency management agency such as the FEMA, relevant social media feeds and police reports. The pool of AI agents comprises one agent for each of the available public datasets.

Figure 8:
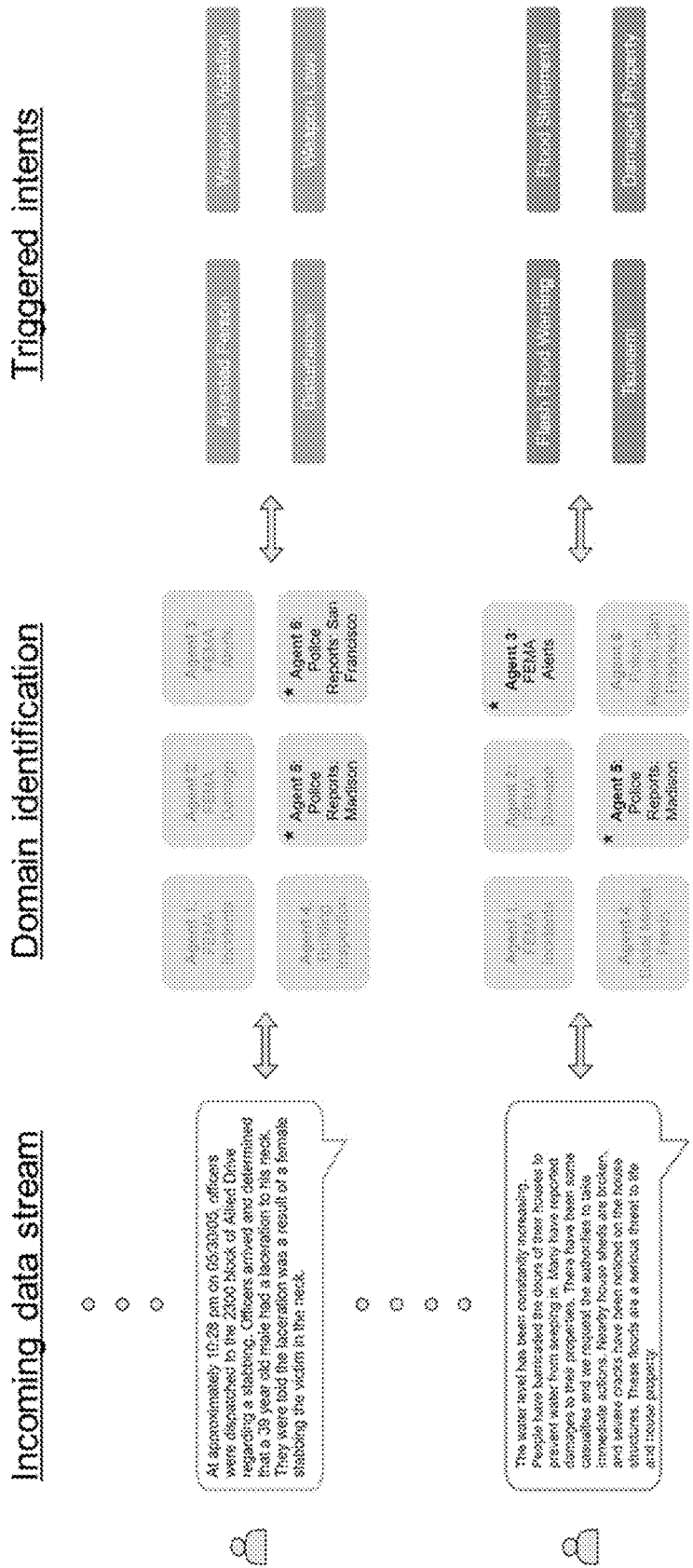
FIG. 8 illustrates using the pool of agents for domain-specific tag generation.
Figure 9:
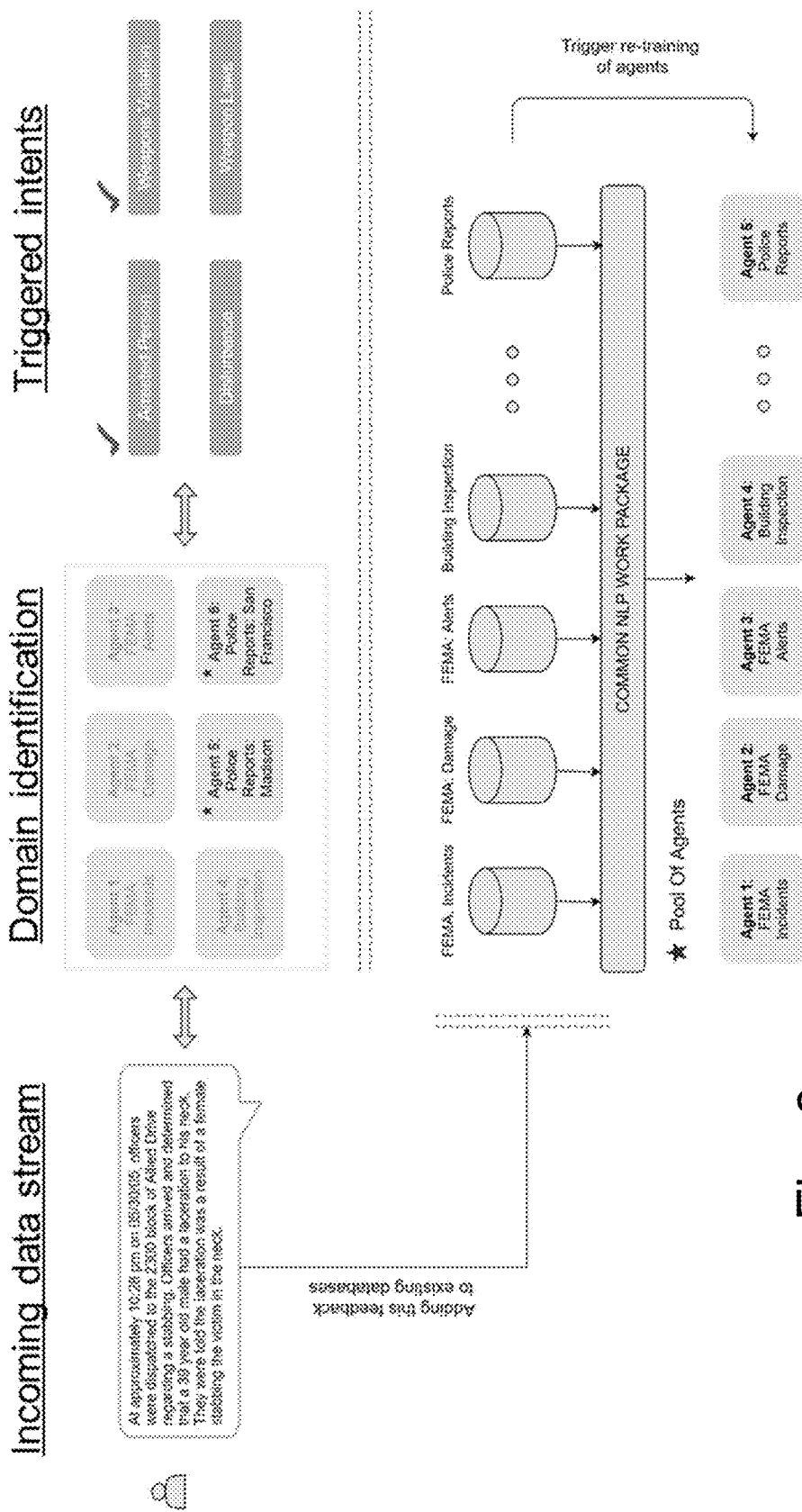
FIG. 9 illustrates improving the agents with feedback from users.

FIGS. 8 and 9 illustrate using the pool of agents for domain-specific tag (meta tag) generation and improving the agents with feedback from users. In the example of FIG. 8, a domain of two messages of the incoming data stream is identified using the pool of agents, which here consists of six agents. Four domain-specific tags are created for each message. The generated tags may be used in conjunction with text-similarity agents to provide targeted recommendations to the operators.

In FIG. 9 a user has given feedback regarding the domain-specific tags by approving two of the four tags as accurate. This feedback is added to existing databases, e.g. the module of FIG. 7, where this feedback is used to trigger re-training of the AI agents.

In an alternative embodiment, the disclosed apparatus and methods may be implemented as a computer program product for use with a computer system. Such implementation may include a series of computer instructions fixed either on a tangible medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a tangible removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software. The embodiments described above are intended to be merely exemplary; numerous variations and modifications will be apparent to those skilled in the art. All such variations and modifications are intended to be within the scope of the present invention as defined in any appended claims.

Although aspects of the invention are illustrated above, partly with reference to some preferred embodiments, it must be understood that numerous modifications and combinations of different features of the embodiments can be made. All of these modifications lie within the scope of the appended claims.

The invention claimed is:

1. A collaboration management system for managing collaboration between a plurality of participating operators, an electronic device being assigned to each participating operator, the system comprising:
a database having stored operator information about the participating operators, the operator information of each operator comprising one or more operator classes assigned to the respective operator;
a data receiver configured to receive a data stream comprising a plurality of electronic messages from a plurality of communicating agents, each electronic message comprising at least one piece of information;
a message parser operatively coupled with the data receiver, the message parser configured to parse the received electronic messages to extract pieces of information of the parsed electronic messages and to classify the electronic messages according to one or more ontologies from a set of pre-defined ontologies;
an unsupervised recommendation engine operatively coupled with the message parser and the database, the unsupervised recommendation engine configured to use pre-trained models and a machine-learning algorithm to decide, based on pre-defined operator rules, on machine learning and a pre-trained artificial intelligence, for each extracted piece of information whether it is considered class-relevant information for at least one of the one or more operator classes, wherein information from both artificial intelligence-based models and rule-based models are combined together, and relevance of a given message for an operator class is identified by a unified criterion;

a data distributor operatively coupled with the unsupervised recommendation engine, the data distributor configured to provide, based on the one or more operator classes assigned to the respective operator, to the electronic device of each operator of at least a subset of the plurality of participating operators, one or more pieces of information that are considered class-relevant information for the respective operator;

a classification module operatively coupled with the message parser, wherein the classification module is configured to identify an information class of an extracted piece of information using trained artificial-intelligence agents, the information class being part of a classification scheme given by one or more of the ontologies from the set of pre-defined ontologies; and one or more non-transitory computer readable media comprising computer executable instructions for operation of the database, data receiver, message parser, unsupervised recommendation engine, and data distributor, wherein the unsupervised recommendation engine is operatively coupled with each electronic devices and configured to monitor each electronic device, to perform clickstream analysis for detecting a behaviour of the participating operators, and to train the machine-learning algorithm based on the detected behaviour.

2. The system according to claim 1, wherein the data distributor is configured to provide the pieces of information via a remote data network.

3. The system according to claim 1, wherein the pieces of information comprise at least one of keywords and named entities.

4. The system according to claim 1, wherein at least a subset of the electronic messages comprises at least one information in the form of textual information, image information, and/or spoken information.

5. The system according to claim 1, wherein at least a subset of the electronic messages are messages that are published on a social-media platform.

6. The system according to claim 1, wherein
at least a subset of the communicating agents are participating operators; and/or
at least a subset of the communicating agents are public organizations wherein at least a subset of the participating operators are associated with one of the public organizations.

7. The system according to claim 1, wherein an electronic device is assigned to each of the plurality of participating operators, and the data distributor is configured to provide the pieces of information to each electronic device, wherein the unsupervised recommendation engine is operatively coupled with each electronic device and configured to monitor each electronic device to detect a behaviour of the participating operators, to determine, based on the detected behaviour, an appropriate operator class for the respective participating operator, and to dynamically assign the determined appropriate operator class as the operator class in the database.

8. The system according to claim 1, wherein at least a subset of the electronic messages is sent from a mobile communication device together with geolocation information, and the message parser is configured to link the geolocation information with the extracted pieces of information.

9. The system according to claim 1, wherein the message parser is configured to parse the received electronic messages to create a plurality of feature snippets based on the extracted pieces of information.

10. The system according to claim 9, wherein the message parser is configured to create at least a subset of the plurality of feature snippets based on at least two parsed electronic messages.

11. The system according to claim 1, wherein the unsupervised recommendation engine is configured
to receive user feedback from the participating operators, the user feedback comprising information on whether a piece of information provided to a participating operator is considered relevant by the participating operator; and
to train the machine-learning algorithm also based on the user feedback.

12. The system according to claim 1, wherein the detected behaviour comprises information on whether a piece of information provided to a participating operator is considered relevant by the respective participating operator.

13. The system according to claim 1, wherein the information class comprises an intent or incident type.

14. The system according to claim 1, wherein the artificial-intelligence agents are trained using a re-trainable natural language processing (NLP) classifier based on a language model.

15. The system according to claim 14, wherein the language model is a Bidirectional Encoder Representations from Transformers (BERT) language model.

16. The system according to claim 1, wherein the unsupervised recommendation engine is configured to derive a decision threshold as a basis for deciding whether or not an extracted piece of information is considered class-relevant information.

17. The system according to claim 16, wherein the unsupervised recommendation engine is configured to derive the decision threshold using a pre-trained Bidirectional Encoder Representations from Transformers (BERT) language model, a logit function, a Softmax function and one or more datasets used for training the pre-trained BERT language model.

18. The system according to claim 1, wherein the data distributor is configured to provide the pieces of information to each electronic device, wherein the unsupervised recommendation engine includes computer executable instructions stored on a non transitory computer readable medium, wherein the unsupervised recommendation engine is operatively coupled with each electronic device and configured to receive user inputs from each electronic device, the user inputs comprising a selection from the respective participating operator of an operator class, and to assign the selected operator class in the database.

19. A method for managing collaboration between a plurality of participating operators, an electronic device being assigned to each participating operator, the method comprising:

receiving a data stream comprising a plurality of electronic messages from a plurality of communicating agents, each electronic message comprising at least one piece of information;

using a message parser to parse the received electronic messages and to extract pieces of information;

classifying the electronic messages according to one or more ontologies from a set of pre-defined ontologies;

accessing a database to retrieve information about the participating operators, the information of each operator comprising one or more operator classes assigned to the respective operator;

using an unsupervised recommendation engine, pre-trained models and a machine-learning algorithm to decide, based on pre-defined operator rules, on machine learning and a pre-trained artificial intelligence, for each extracted piece of information and for at least one operator class of the one or more operator classes, whether the extracted piece of information is considered class-relevant information for the respective at least one operator class, wherein information from both artificial intelligence-based models and rule-based models are combined together, and relevance of a given message for an operator class is identified by a unified criterion;

providing to the electronic device of each operator of at least a subset of the plurality of participating operators, based at least on the one or more operator classes assigned to the respective operator, pieces of information that are considered class-relevant information for the respective operator; and identifying an information class of an extracted piece of information using trained artificial-intelligence agents, the information class being part of a classification scheme given by one or more of the ontologies from the set of pre-defined ontologies, wherein the unsupervised recommendation engine is operatively coupled with each electronic devices, monitors each electronic device, performs clickstream analysis for detecting a behaviour of the participating operators, and trains the machine-learning algorithm based on the detected behaviour.

20. A computer program product including a non-transitory computer-readable medium having computer code thereon for managing collaboration between a plurality of participating operators, an electronic device being assigned to each participating operator, the computer code comprising:

program code for receiving a data stream comprising a plurality of electronic messages from a plurality of communicating agents, each electronic message comprising at least one piece of information;

program code for parsing, by a message parser, the received electronic messages to extract pieces of information;

program code for classifying the electronic messages according to one or more ontologies from a set of pre-defined ontologies;

program code for accessing a database to retrieve information about the participating operators, the information of each operator comprising one or more operator classes assigned to the respective operator;

program code for controlling an unsupervised recommendation engine to use pre-trained models and a machine-learning algorithm for deciding, based on pre-defined operator rules, on machine learning and a pre-trained artificial intelligence, for each extracted piece of information and for at least one operator class of the one or more operator classes, whether the extracted piece of information is considered class-relevant information for the respective at least one operator class, wherein information from both artificial intelligence-based models and rule-based models are combined together, and relevance of a given message for an operator class is identified by a unified criterion;

program code for providing to the electronic device of each participating operator of at least a subset of the plurality of participating operators, based at least on the one or more operator classes assigned to the respective participating operator, pieces of information that are considered class-relevant information for the respective participating operator; and program code for identifying an information class of an extracted piece of information using trained artificial-intelligence agents, the information class being part of a classification scheme given by one or more of the ontologies from the set of pre-defined ontologies, wherein the unsupervised recommendation engine is operatively coupled with each electronic devices and the computer code comprises program code for controlling the unsupervised recommendation engine to monitor each electronic device, to perform clickstream analysis for detecting a behaviour of the participating operators, and to train the machine-learning algorithm based on the detected behaviour.

* * * * *